A. P. BRUSH.
ENGINE LUBRICATING SYSTEM.
APPLICATION FILED AUG. 17, 1918.
1,386,154.
Patented Aug. 2, 1921.
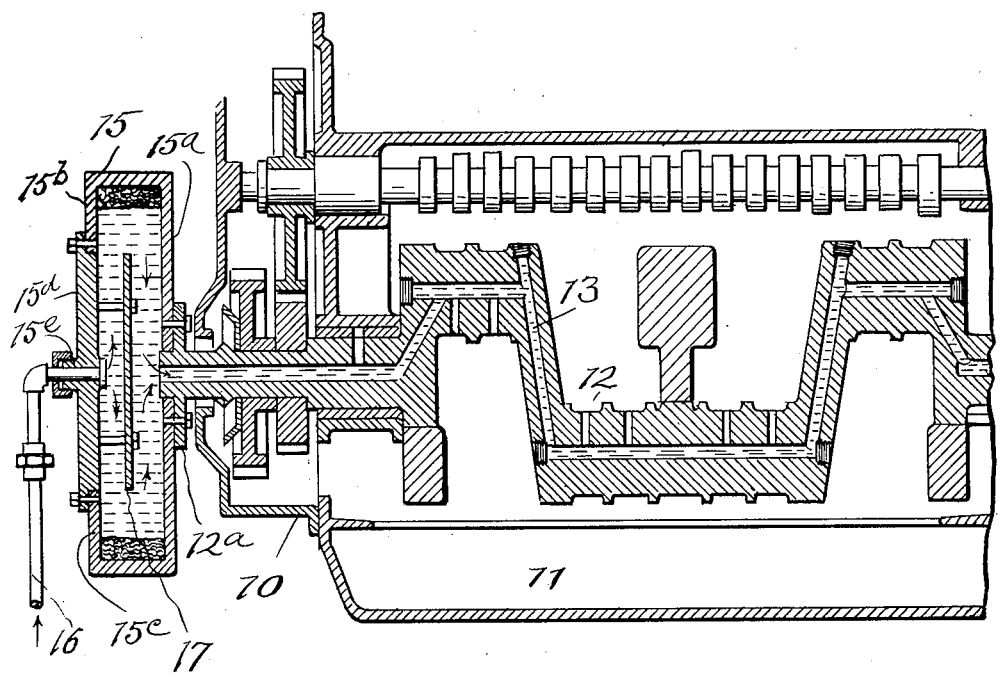

UNITED STATES PATENT OFFICE.

ALANSON P. BRUSH, OF DETROIT, MICHIGAN.

ENGINE-LUBRICATING SYSTEM.

1,386,154.  Specification of Letters Patent.  Patented Aug. 2, 1921.

Application filed August 17, 1918. Serial No. 250,375.

*To all whom it may concern:*

Be it known that I, ALANSON P. BRUSH, a citizen of the United States, residing at Detroit, in the county of Wayne and State of Michigan, have invented a certain new and useful Improvement in Engine-Lubricating Systems, of which the following is a full, clear, and exact description.

This invention relates to engine lubricating systems and has particular reference to internal combustion engines having a crankshaft with an oil line or passageway to convey lubricant to the various bearings along the shaft.

A great deal of difficulty has been encountered with various kinds of motor vehicles such as road vehicles and tractors due to the fact that dirt and dust is carried into the engine through the carbureter and eventually finds its way into the oil sump and is carried by the lubricant to the various bearing surfaces, resulting in serious damage to the latter. A great deal of effort has been expended and experimentation carried out to prevent dust being carried into the engine in this manner, these attempts being generally along the line of cleansing the air before it passes to the carbureter, but though many different forms of so-called air-cleaners or air-strainers have been tried out, and while they all separate a portion of the foreign particles from the air, nevertheless, none, as far as I am aware, have been sufficiently efficient to entirely free the air of foreign particles, particularly the very fine, light dust, with the result that this dust is carried to the bearings as before stated.

It is the principal object of this invention to overcome the difficulty above mentioned, and this I accomplish by providing in the lubricating system of the engine a centrifugal separator which effectively separates the solid or foreign particles from the lubricant before it passes to the bearing surfaces.

While in the broad aspects of the invention the centrifugal separator may be provided at any suitable point in the system and may be operated in any desired manner, it is preferably mounted on or incorporated with the crankshaft so as to eliminate the necessity of a separate shaft and special driving devices.

The invention may be further briefly summarized as consisting in certain novel combinations and arrangements of parts which will be described in the specification and set forth in the appended claims.

In the accompanying sheet of drawings, the single figure of the drawing shows somewhat conventionally, a portion of an internal combustion engine with a lubricating system embodying my invention.

Referring now to the drawing, 10 represents the crankcase having at the bottom the usual oil sump 11 containing a quantity of oil, and from which the oil is circulated to the bearing surfaces to be lubricated. The crankshaft, and in fact, the engine itself, may be of any suitable construction, and may have any number of cylinders, as the details of the engine, aside from the particular improvements herein mentioned and subsequently to be described in detail, are not material.

The crankshaft which is shown at 12, has an oil line 13 extending therethrough, and ducts extend from this line in the usual manner to lubricate the supporting bearings 14 of the crankshaft and the bearings for the several connecting rods.

For the purpose hereinbefore mentioned, *i. e.* to clean the oil before it passes through the oil line of the crankshaft, I provide in the oil circulating system a centrifugal separator which is rotated by the crankshaft and is preferably, although not necessarily, formed on or attached to the crankshaft, either at the forward or rear end, depending upon the end to which the oil is fed by the pump.

In this instance the centrifugal separator which is shown at 15, is attached to the front end of the crankshaft 12, being in the form of an annular chamber bolted to a flange 12ª of the crankshaft. Other ways of attaching the separator to the crankshaft may be utilized if desired.

While the form and construction of the separator may be other than here shown, in this instance the rear side 15ª has a centrally disposed opening of a size which will fit on the end of the crankshaft adjacent the flange 12ª to which the chamber is bolted, and it has an outer peripheral wall 15ᵇ, and in front an inturned flange 15ᶜ, to which is secured a central removable plate 15ᵈ which can be removed whenever it is desired to clean the chamber of sediment which has been thrown outwardly toward the periphery by centrifugal force. The removable plate 15ᵈ as here shown, is provided with an outstanding boss 15ᵉ with a passageway extending inwardly therethrough, and to which there is connected with a running fit, suitably arranged to prevent leakage, the oil supply pipe 16, through which oil is forced by the pump.

Between the front and rear walls of the chamber, and in this case, attached to the removable plate 15ᵃ, is a baffle in the form of a plate 17 which prevents the lubricant passing in a straight line from the pipe 16 to the inlet end of the oil line of the crankshaft.

In operation, the chamber 15 is filled with oil, and when the engine is in operation, since the chamber of the separator is attached directly to the crankshaft, it will be rotated at high speed or at the speed of the crankshaft, and in consequence the oil is thrown outwardly toward the periphery of the chamber, due to its rapid rotation, and the foreign particles are thrown outwardly and cling to the periphery of the chamber. Due to the presence of the baffle, the oil must pass outwardly beyond the periphery of the baffle which is located a suitable distance from the periphery of the casing, but the lateral flow of the oil from one side of the baffle to the other is sufficiently slow that practically no foreign particles will be carried inwardly toward the crankshaft, and in consequence the oil which passes through the crankshaft is thoroughly and effectively cleaned of foreign particles. As before stated, the dirt and other foreign particles will form a more or less solid plastic mass on the peripheral wall of the casing outside of, or beyond the baffle, and from time to time this will be removed by removing the plate 15ᵃ which can be accomplished without difficulty by disconnecting the pipe 16.

Therefore with this improvement, even though the air is not effectively cleaned before it enters the carbureter, and although this dirt finds its way to the oil in the sump, it is separated from the oil and prevented from reaching the bearings.

Having described my invention, I claim:

1. In an engine, the combination of the crank shaft thereof, a lubricating system for supplying lubricant to the bearing surfaces of the shaft, a centrifugal separator adapted to separate foreign particles from the lubricant and including means for causing the lubricant to flow outward toward the periphery of the separator in its passage through the separator, and means whereby the centrifugal separator receives rotary motion from the crank shaft.

2. In an engine, the combination of the crank shaft, a lubricating system for lubricating the bearing surfaces of the crank shaft, and a centrifugal separator including a rotating body incorporated with the crank shaft for separating foreign particles from the lubricant supplied to the bearing surfaces.

3. In combination with an engine having a crankshaft with a lubricating passageway extending therethrough to supply lubricant to the bearing surfaces, of a centrifugal separator for separating foreign particles from the oil located in the system in advance of the oil line of the crankshaft, said separator being rotated by the crankshaft.

4. In combination with an engine having a crankshaft forming part of a lubricating system including an oil line extending through the crankshaft to convey lubricant to the bearing surfaces, of a centrifugal separator comprising a chamber adapted to be rotated by the crankshaft and located in the lubricating system in advance of the point of supply to the oil line of the crankshaft.

5. In combination with an engine having a crankshaft forming part of a lubricating system including an oil line extending through the crankshaft, of a centrifugal separator in the lubricating system in advance of the point of supply of oil to the oil line of the crankshaft and incorporated with the crankshaft so as to be directly rotated thereby.

6. In an internal combustion engine, the combination of the crank shaft, a lubricating system for supplying lubricant to the bearing surfaces of said crank shaft, and a centrifugal separator for separating foreign particles from the lubricant, said separator comprising a rotary body attached to the crank shaft.

7. In combination with an internal combustion engine having a crankshaft forming part of a lubricating system including an oil line extending through the crankshaft, of a centrifugal separator for separating foreign particles from the oil, said separator comprising a rotary body attached to one end of the crankshaft.

8. In combination with an internal combustion engine having a crankshaft forming part of a lubricating system including an oil line extending through the crankshaft for conveying oil to the bearing surfaces thereof, of a centrifugal separator including a rotating body incorporaated on the crankshaft so as to be rotated thereby and having inlet and outlet openings for the oil, the latter leading to the oil line of the crankshaft, and said body provided on the interior with means whereby oil is required to pass toward the periphery of the rotating body before passing to the crankshaft.

9. In combination with an engine having a crankshaft and a lubricating system for supplying lubricant to the bearing surfaces of the crankshaft, a centrifugal separating chamber and container for the accumulation of foreign matter which may be in the lubricant and of greater specific gravity than the combination of a conduit having two longitudinally spaced apart apertured partitions in the bore thereof, one of said partitions provided with a valve seat and the other partition provided with an aperture to permit the passage of fluid therethrough, a floating secondary valvular device including a valve element positioned between said partitions and adapted to be moved by the pressure of the fluid onto said seat to intercept the flow through the conduit, and extensions for guiding the valve element to and from its seat, said extensions projecting longitudinally from opposite sides of the valve element and slidably mounted in and extending through the apertures in said partitions and means for securing a second conduit inserted in the first named conduit and said second conduit adapted to engage the adjacent extension to hold the valve element in spaced relation to its seat and thus permit a flow past the seat.

4. In a device of the class described, the combination of a coupling having an annular valve seat in the bore, said bore being threaded on opposite sides of the seat, a guiding ring engaging the threads on one side of the seat and constituting a stop for limiting the unseating movement of a coacting valve and the threads on the other side adapted to receive a valve unseating member, and a valvular structure including a valve for engaging said seat to close the bore and provided with an extension slidably mounted in said ring and guided thereby to effect a seating of the valve on said seat when free of the valve unseating member.

5. In a device of the class described, the combination of a member provided with a bore, a valve seat in said bore, a floating valve structure including a valve adapted to be normally closed onto said seat by the pressure of the fluid in said bore and provided with an extension adapted to be engaged by an insert introduced into the bore for holding the valve in unseated position, and guiding means for the structure adjustable relative to the seat to insure a proper seating of the valve and to limit the retreat of the valve away from said seat under the influence of said insert.

6. In a device of the class described, the combination of a conduit provided with a valve seat, of a valve adapted to fit said seat and adapted to be forced onto said seat by the fluid pressure in said conduit, a second conduit distinct from the first named conduit and adapted to bear on the valve and thus hold the valve off its seat and means adjustable relative to the seat for guiding the valve in its closing movement onto its seat.

Signed at New York city, in the county of New York and State of New York, this 9th day of April, A. D. 1920.

WALTER B. WOORE.